Patented Feb. 28, 1933

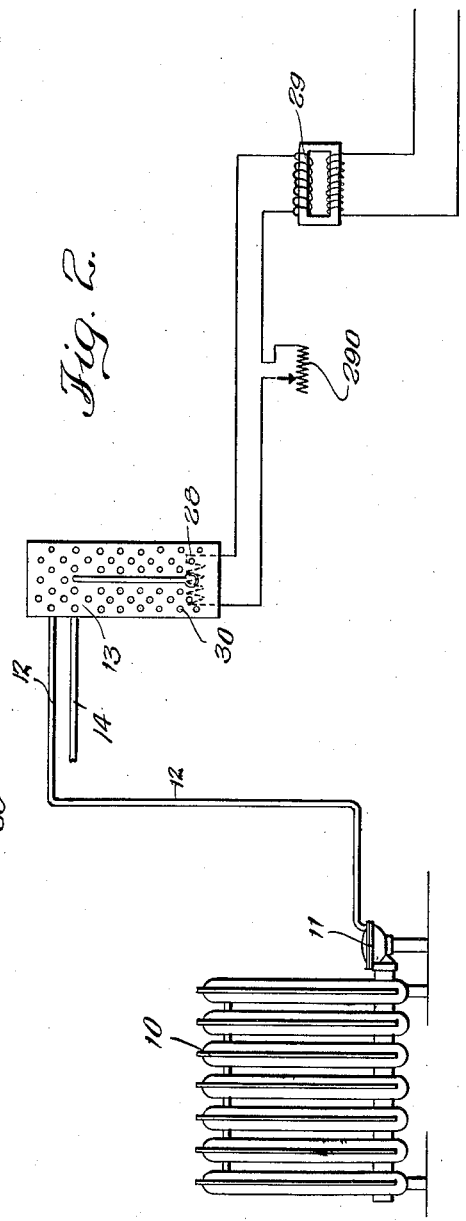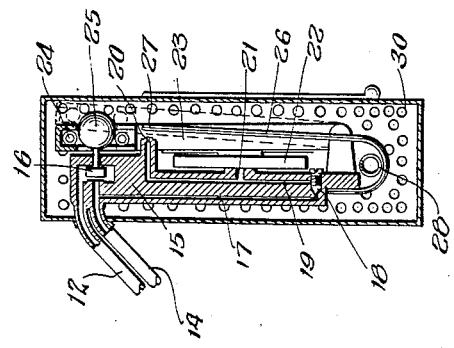

1,899,532

UNITED STATES PATENT OFFICE

WILFRED SHURTLEFF, OF MOLINE, ILLINOIS, ASSIGNOR TO THE HERMAN NELSON CORPORATION, OF MOLINE, ILLINOIS, A CORPORATION OF ILLINOIS

TEMPERATURE CONTROLLING MEANS

Application filed February 8, 1929. Serial No. 338,405.

This invention relates to temperature controlling means.

In heating and ventilating confined spaces, air motion is considered by engineers to be necessary in diffusing the air and preventing stratification, but under certain conditions there is likelihood of so-called "drafts" developing which are unpleasant to the occupants, resulting in discomfort even when the temperature as measured by the "dry" bulb thermometer discloses a normal temperature, say of 68° F.

It has been observed that drafts occurring through air motion as above pointed out, are not noticeable when the temperature is somewhat higher than normal, that is, when a dry bulb temperature somewhat higher than 68° F. is maintained, air motion does not cause a noticeable feeling of coolness such as occurs under ordinary normal temperature conditions, and hence it is desirable, when air motion occurs, to provide for raising the temperature during a continuance of this condition, and to restore the original temperature when the drafty condition ceases to exist in order to prevent occupants becoming too warm.

An object of the invention, therefore, is to provide means responsive to air motion in combination with actuating means which operate to raise the temperature when air motion is taking place and to decrease temperature when the air is still or without motion.

A more particular object of the invention is to provide a device including a thermostatic element for controlling a heat source and in conjunction therewith, provide means responsive to air motion for bringing about actuation of the heat source in accordance with the temperatures desired when air motion is taking place and when it ceases.

Other and further objects of the invention will more clearly appear from the description and claims hereinafter following.

In the drawing forming a part of this specification, Figure 1 is a vertical, sectional view through a thermostatically controlled device embodying my invention. And Figure 2 is a diagrammatic view of the invention as utilized in a heating system.

As shown in the drawing, a heat source is provided which may be in the form of the radiator indicated at 10 or any other apparatus, the radiator 10 being regulated by a diaphragm controlled valve 11, of a well known type, the valve 11 being adapted to be actuated by compressed air leading through the pipe 12 from the thermostatic element 13, a compressed air supply conduit 14 leading to the thermostat in a manner hereinafter pointed out, it being understood that when compressed air passes through the pipe 12, the valve 11 is operated to cut off the radiator and when the air is exhausted from the pipe 12 to reduce the pressure therein the valve 11 is operated to admit heat to the radiator.

As best shown in Figure 1, the thermostatic element includes a support 15, provided with a valve 16 adapted to open and close the pipe 12 leading to the valve 11. Communicating with the source of compressed air supply through the pipe 14, and independent of valve 16, is a duct 17, said duct at its bottom having a needle valve 18 allowing a slow leak of air into a duct 19. The duct 19, has a discharge port indicated at 20. The duct 19 is also provided with a passageway 21 leading into a sylphon diaphragm 22 connected to the rocking lever 23 for operating said lever. The lever 23 at its upper end is provided with a compartment for a coiled spring 24 arranged in annular form and adapted to cooperate with the ball end 25 of the valve 16, so that when the diaphragm swings the lever outwardly the ball is actuated in a direction to move the valve 16 against its seat and close pipe 12 from the supply of compressed air and also allowing the pressure in the pipe 12 to exhaust through the port around the stem of valve 16. A bi-metallic element 26 is secured at the lower end of the support 15 and the upper end of the same is adapted to open and close the outlet port 20 of the duct 19 as indicated at 27 in response to temperature.

Arranged adjacent the lower portion of the support 15 is a heating coil 28, the opposite ends of which may be connected by a suitable plug to an ordinary lighting circuit, a small transformer 29 of any well known type being interposed in the circuit for cutting down the voltage and a suitable rheostat 290 of any well known form employed for varying the heating properties of the coil. Disposed about the thermostatic device is a casing provided with a plurality of perforations indicated at 30, the arrangement being such that the casing provides a small segregated compartment adapted to be heated by the coil 28 to a temperature in excess of the temperature of the room in which the thermostatic device is placed, the openings 30 providing for the passage of air currents through the casing in proximity to the heater 28, whereby the heat may be dissipated from within the casing.

In practice, the heating coil 28 within the housing of the thermostat is designed to maintain a temperature of about 7° in excess of the surrounding room temperature when the latter temperature is 65° F. with no air motion perceptible. Under these conditions the bi-metallic element 26 will be in position shown in Fig. 1 in full lines, ready to close the opening 20 of the duct 19 when the temperature within the housing varies from 72°, corresponding to 65° room temperature. When the temperature falls below 65°, the thermostatic element contracts and closes the port 20, whereupon compressed air from the pipe 14 will pass through the duct 19 and into the bellows 22 through the passage 21, resulting in the arm 23 being forced outwardly to the dotted line position, and the ball 25 of the valve 16 to pass through the coiled spring 24, closing passage of the compressed air through the pipe 12, and permitting the valve 11 to open the radiator. In other words, should the room temperature fall below 65°, the higher temperature within the housing will be correspondingly decreased, owing to the inability of the heating coil to maintain the temperature therein, and the bi-metallic element, in response to the decrease, closes the port 20 and causes the radiator to be opened to supply additional heat to the room.

However, assuming that although the room temperature remains at 65°, the air motion in the room now becomes perceptible so as to generate currents which pass through the perforated housing of the thermostatic device, dissipating the excess heat therein, the heating coil 28 being unable to maintain the excess heat. This would be the equivalent of a decrease in room temperature, and the decreased temperature acting upon the bi-metallic element will drop, causing movement of said element to close the opening 20. This results in movement of the arm 23 so as to close the valve 16, and close communication through the pipe 12 with the valve 11 to cause the radiator to deliver additional heat, and additional heat will be furnished so long as the air motion is of such character as to dissipate and hold down excess temperature within the housing. When the air motion ceases the temperature within the housing again rises and acts upon the bi-metallic element to open the port 20 and cut off the radiator.

It will be observed that the presence of abnormal air currents in the room must be compensated by additional heat in order to maintain a comfortable temperature in the room, and this compensation is brought about by the response of the heat zone around the thermostat to these abnormal air currents.

By the above described arrangement, it will be appreciated that the heater coil within the thermostatic device is designed to maintain a localized heat zone acting upon the thermostatic element, whereby the radiator is operated to maintain a normal heat level when there is no perceptible air motion; however, as soon as the additional heat supplied by the heating coil is dispersed through currents of air entering the perforated housing of the thermostatic device, the thermostatic element assumes position to permit resumption of operation of the radiator which results in raising the dry bulb temperature of the room above the temperature normally provided, thus compensating for the uncomfortable condition which would otherwise exist with increasing air currents.

While I have herein shown and described what I now consider the preferred manner of carrying out my invention, but the same is merely illustrative and I contemplate all changes and modifications that come within the scope of the claims appended hereto.

I claim:—

1. The combination of a room to be heated, heating means for the room, a thermostat within a perforated casing for controlling said heating means subject to a predetermined still air temperature in the room, an independent heater adjacent the thermostat within said perforated casing for subjecting said thermostat to a temperature in a variable excess of said predetermined room temperature, said excess temperature being subject to dissipation by air in motion to operate said thermostat and cause said heating means to increase the room temperature in response to said air in motion independently of said predetermined temperature to provide a compensated room temperature substantially equivalent to still air temperature.

2. In a heating system, a radiator for heating the room, a valve for said radiator, a thermostat within a perforated case directly responsive to the room temperature to control the valve, and means for continuously supplying predetermined quantities of additional heat within said perforated casing responsive to air currents to cause the thermostat to increase the room temperature in proportion to the uncomfortable effects of said air currents.

3. In a temperature controlling system of the character described, the combination of a room to be conditioned, heating means for said room, a thermostat responsive to air temperature within the room for controlling said heating means, and means for causing said thermostat to control said heating means in response to the motion of air at such, said means comprising an independent heater adjacent said thermostat for creating a local zone of air temperature in excess of the air temperature of the room and a perforated casing enclosing said thermostat and heater for retaining said zone of excess air temperature in effective relation to said thermostat subject to dissipation by the motion, as such through the perforations, of air within the room.

In witness that I claim the foregoing I have hereunto subscribed my name this 29th day of January 1929.

WILFRED SHURTLEFF.